Figure 4:
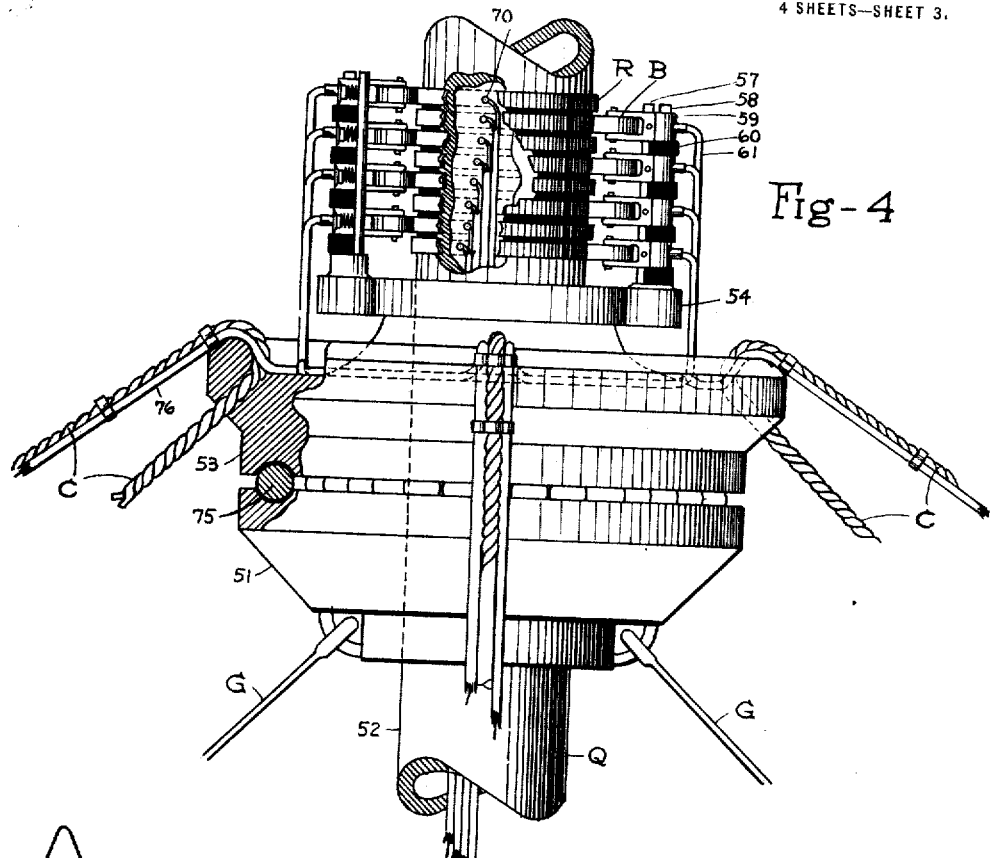

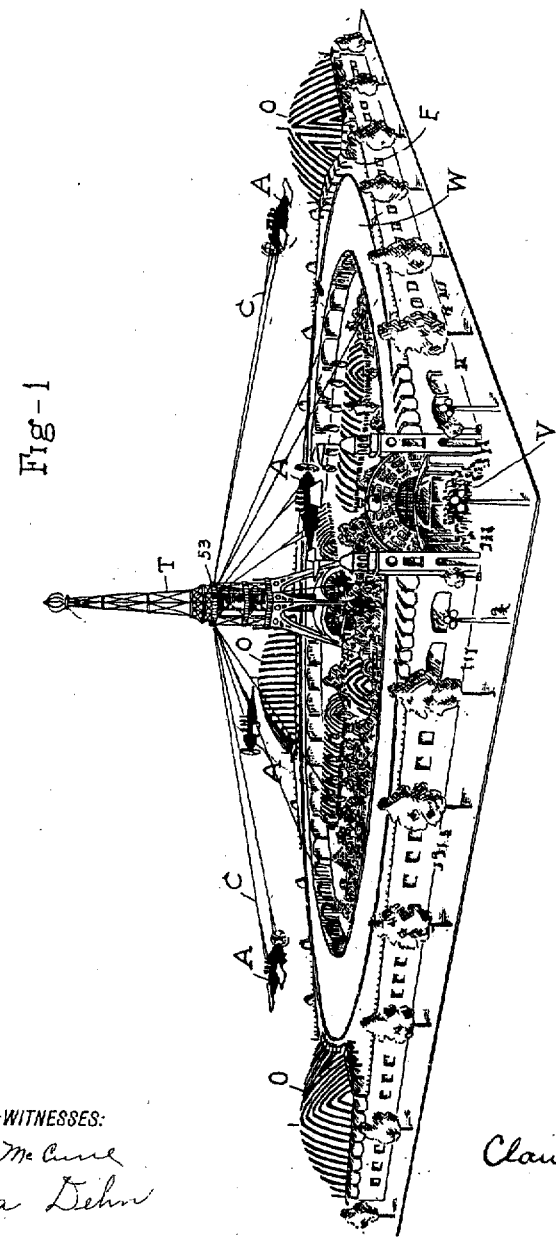

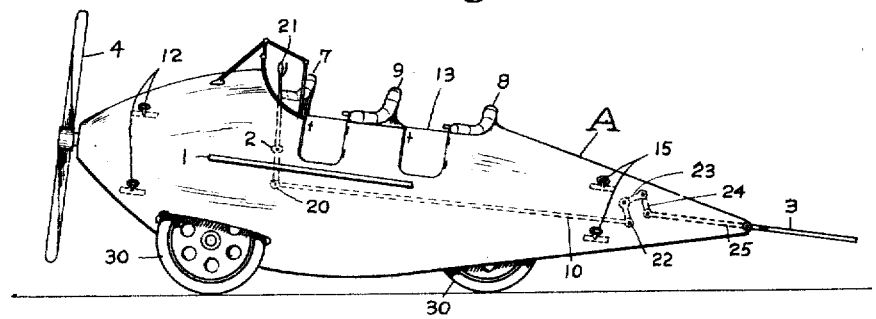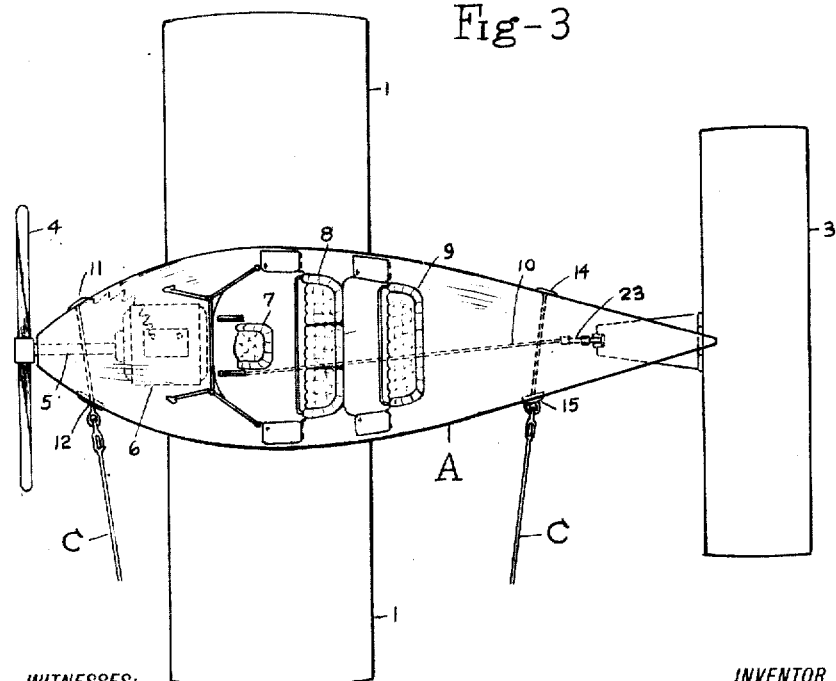

C. S. McCOOLE.
CAPTIVE AEROPLANE.
APPLICATION FILED MAY 13, 1915.

1,201,839.

Patented Oct. 17, 1916.
4 SHEETS—SHEET 3.

WITNESSES:
Anna McCune
Ada Dehn

INVENTOR
Claude S. McCoole

BY
Joseph L. Wright
ATTORNEY

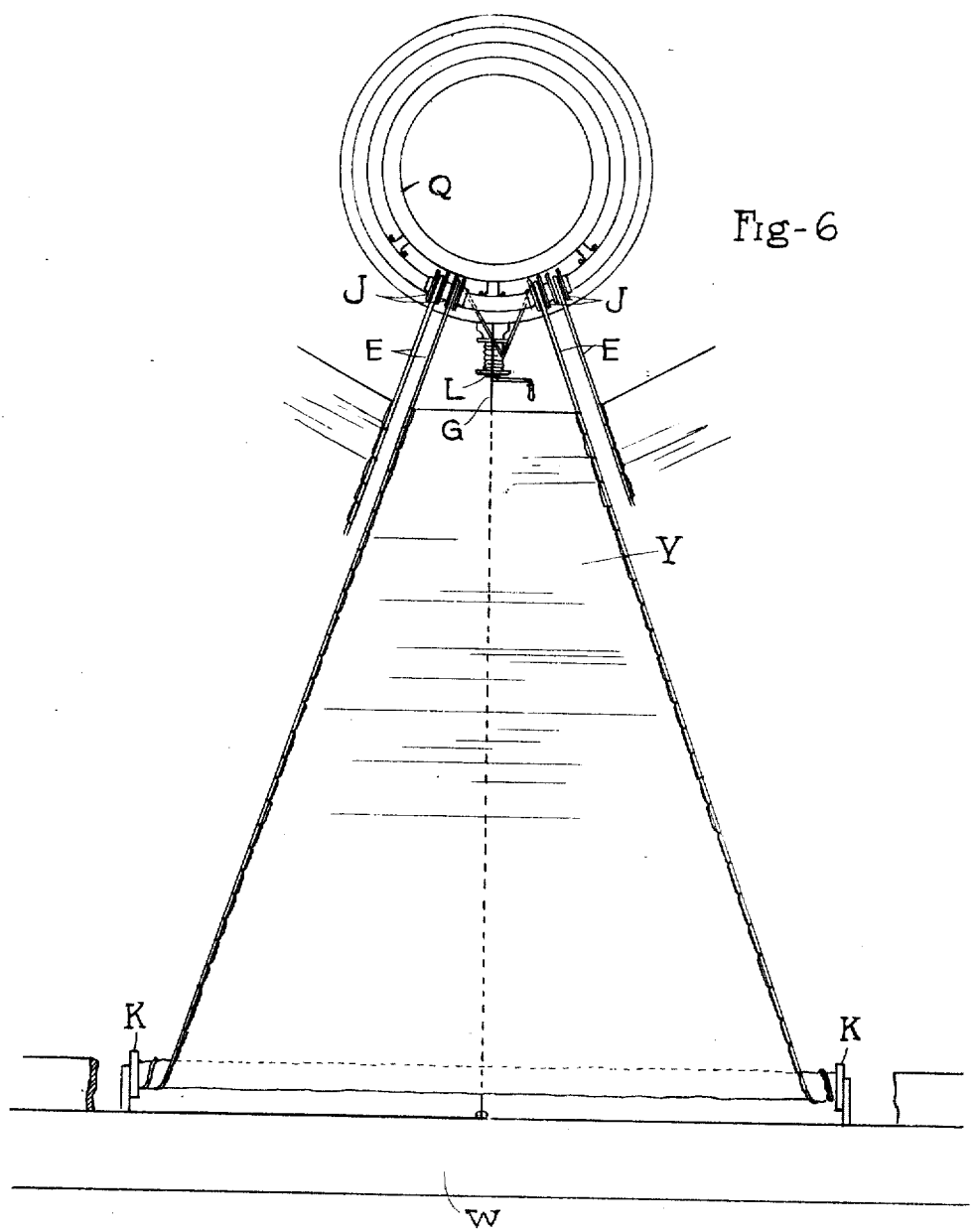

UNITED STATES PATENT OFFICE.

CLAUDE S. McCOOLE, OF LORAIN, OHIO.

CAPTIVE AEROPLANE.

1,201,839.  Specification of Letters Patent.  Patented Oct. 17, 1916.

Application filed May 13, 1915. Serial No. 27,764.

*To all whom it may concern:*

Be it known that I, CLAUDE S. MCCOOLE, a citizen of the United States, residing at Lorain, in the county of Lorain and State of Ohio, have invented certain new and useful Improvements in Captive Aeroplanes, of which the following is a specification.

My invention relates to aeroplane devices and especially wherein such devices are used for amusement purposes or for teaching the art of aeronautics. When used for such purposes it is desirable that provision be made for allowing the flight of the aeroplane to be under control of the operator.

With my invention a number of aeroplanes are suitably attached to and movable about a restraining tower. The tower is provided with a movable hub or ring. From this ring flexible cables, preferably of steel, extend to and are fastened to the various aeroplanes. Encircling the tower is an elevated speedway upon which the aeroplanes normally rest and upon which they travel before acquiring proper speed for flight. After attaining proper speed or momentum the aeroplanes arise from the speedway and encircle the tower. The flight in an upward or downward direction is under control of the operator.

Each aeroplane is provided with an individual motor and the usual switches and rheostat for regulating its speed. The cables or conductors carrying the current to the motor extend to a master switch located in the tower. This switch is under control of the operator in the tower who, when desired, can cut off the current from the motors in the various aeroplanes and permit them to come to rest.

Where the device is used for carrying passengers a pilot is provided for each car. The pilot upon a signal from the operator located in the tower will place the motors in operation, the speed of each aeroplane being under control of its own pilots After the motor is started each aeroplane, which is provided with wheels, will start to travel about the speedway. In starting the restraining cables will be drawn taut and after the aeroplanes acquire sufficient speed they will rise from the speedway. The flight, of course, will be controlled by the planes and also by the centrifugal force developed.

Athough each aeroplane is fastened to the same hub or ring by restraining cables, its flight in an upward or downward direction is independent of the others and under control of its pilot.

When it is desired to stop the flight of the aeroplanes, each pilot at a signal from the operator in the tower cuts off current from his respective motor or the operator can use the master switch and cut off the current for all the motors at the same instant. In either event the aeroplanes will continue their flight after the motors stop running, due to the momentum acquired. The centrifugal force exerted by the aeroplanes attached to the restraining cables will compel the cables to remain taut and straight out from their point of fastening. As the momentum decreases the aeroplanes gradually descend and settle upon the speedway.

When my device is used as an amusement feature the speedway which encircles the tower also forms an inclosure about the tower which can be utilized for various purposes. The area of the inclosure can be of any desired extent, depending upon the length of the restraining cables, which can be several hundred feet in length. The speedway in fact forms an inclosure for the amusement resort within which can be located various other amusement features. This inclosure to which an entrance is gained through the speedway provides space for loading and unloading of the passengers.

Figure 5:
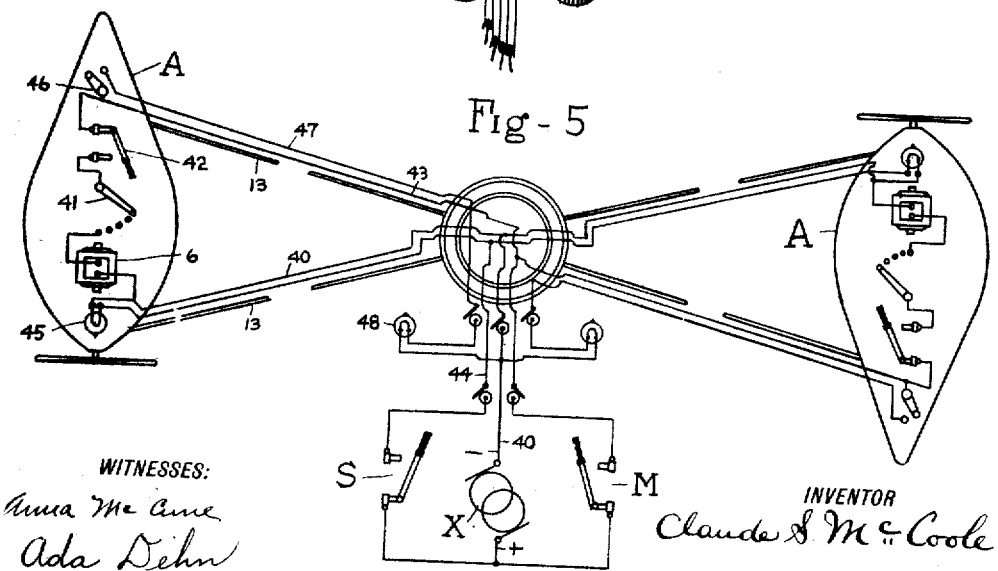

My invention is illustrated in the accompanying drawings wherein:

Figure 1 shows the general arrangement of the aeroplanes, the restraining tower and speedway. Fig. 2 is a side view of an aeroplane. Fig. 3 is a plan view of an aeroplane. Fig. 4 shows in detail the arrangement of the Hub and the electrical connections. Fig. 5 shows the signaling and controlling circuits. Fig. 6 shows in detail a section of the canopy serving to form a covering for the inclosure within the speedway.

Referring to Fig. 1, I have shown four aeroplane devices at A fastened to the restraining tower T by means of the restraining cables C. The elevated speedway is shown at W encircling the tower T. It will be noted that the speedway forms the inclosure about the tower T to which access is gained through the entrance V. Within the inclosure may be located other forms of amusement devices or concessions as illustrated.

As shown in Fig. 1 three pavilions or buildings shown at O and the entrance V are equally spaced about the speedway. The inclosure thus formed constitutes a square, the entrance being at one corner of the square and the pavilions located at the other three corners. Entrance to the speedway itself is preferably made from these pavilions by means of the doors designated at F. The inclosure within the speedway may be entirely covered or shaded.

Figs. 2 and 3 show views of the preferred form of aeroplane or car. The body of the car is of fusiform shape and when at rest is supported by means of three wheels 30. Two of these wheels are located at the forward end of the car while a single wheel is located at the rear end of the car. Entrance to the car is secured through the doors indicated at 13. These doors are of the type used in automobiles. The seats 8 and 9 are provided for the passengers while the seat 7 is for the pilot who controls the car. The seats can be hinged or arranged in any desired manner to allow an aisle for the passengers entering or leaving the car. The aeroplane is provided with the planes 1 rigidly fastened to the body of the car in any desired manner. The tail is manipulated in an upward and downward position by means of the lever handle 21, which is under control of the pilot.

The propeller 4 is attached to the shaft of the motor 6 as shown in Fig. 3. The speed of the motor is regulated by the pilot by means of the rheostat 41 (Fig. 5) as will be explained hereafter.

Referring particularly to Fig. 3, it will be noted that the restraining cables C are fastened to bolts 15 which pass completely through the body of the car at the same angle with the restraining cables. Instead of providing the bolts 15 the cable C could pass directly through the body of the car and in that event the bolts 15 would be omitted. By providing the bolts, however, the car can be removed from the restraining cables by any suitable form of fastening device between the cables and the bolts. This arrangement allows the car to be disconnected and removed from the speedway when desired.

In view of the weight of the car and the centrifugal force developed when in flight it is essential that proper support be given to the body of the aeroplane.

With the arrangement described the body of the aeroplane is in reality held or supported within the loops formed by the forward and rear restraining cables.

Referring to Fig. 4, the hub or ring to which is attached the cables C for restraining and directing the aeroplanes is shown at 53. This hub or ring is supported by means of the carriage or disk 51 which is rigidly fastened to the column Q which forms a part of the tower T shown in Fig. 1. This column Q can be of steel or any other suitable material. The carriage 51 is provided with the roller bearings 75 upon which the hub 53 freely turns. The hub 53 is provided with openings through which the restraining cables C pass. There will be one of such openings for each cable or two for each aeroplane. One cable is fastened to the forward end of the car or aeroplane and another fastened to the rear end, as plainly shown in Fig. 3. In assembling the device a cable is passed through one of the openings in the hub forming a loop. Both ends of this loop are then fastened to the bolts 15 at the forward end of the car. Another cable is then passed through a second opening in the hub also forming a loop and both ends of this loop are then fastened to the bolts 15 at the rear end of the car. With this arrangement each car is fastened to the hub or ring by two V shaped restraining cables extending from the movable hub 53. The carriage 51 which supports the hub 53 is securely anchored to the speedway W by means of the cables G. These cables are shown in Figs. 1 and 6. The hub 53 is provided with a disk or table 54 which carries the brushes or rollers B which form the electrical connections to the various aeroplanes. These brushes or rollers engage fixed rings R which are fastened to a fixed portion of the tower and insulated from one another in any suitable manner. The hub 53 in rotating carries with it the disk 54 which in turn carries the rollers B. In rotating these rollers remain in continuous engagement with the contact rings R. The feeder wires for carrying current for operating the various signals are preferably connected to the inner-sides of the rings as shown at 70. These feeder wires or cables pass through the casing Q in the manner shown. The restraining cables C serve to support the electrical conductors leading to the respective aeroplanes. The restraining cables C are so positioned that one end of the loop is fastened to the body of the car below the center of gravity while the other is fastened above the center of gravity. This manner of fastening is the same with both the rear and forward cables. When the aeroplane is in flight it remains practically level as the arrangement of the cables serves both to equalize the pull and maintain its balance.

Referring to Fig. 5, X represents the source of current supply for operating the motors and signals. M is the switch under control of the operator in the tower for connecting current to the motors in the aeroplanes, while the switch S is for operating signals in the aeroplane. Lamps 48 are also located in the tower, one being individual to each aeroplane and controlled by its respective switch 46 located in the aeroplane and under control of the pilot. 42 is a switch operated by the pilot for connecting current to the motor 6, while 41 is the rheostat for regulating the speed of the motor. 45 is the signal lamp controlled by the switch S.

Referring to Fig. 6, a section of the canopy or covering is shown at Y. There will be one of these sections for each supporting cable G extending from the tower to the speedway. When not in use each section Y is rolled up on a reel K located under the speedway. Ropes or flexible cables E reinforce the sides of each section. These ropes extend to and are fastened to a reel L located at a convenient place in the tower. When it is desired to cover or shade a particular portion of the inclosure, the reel L is operated thereby causing the ropes E to be wound around the reel causing the section Y to be drawn up to the desired height. Each cable G acts as a center support or rib for its particular section of covering. As the control of each aeroplane is the same it will only be necessary to describe in detail the operation of one. In describing the operation of the motor and signal control I will use the circuit connections of the aeroplane to the left of Fig. 5.

The operator in the tower first throws in the motor switch M which places current under control of each pilot for starting his motor. After throwing in the switch M the operator throws in the switch S thereby lighting lamp 45, notifying the pilot that current has been supplied for operating the motor. When the switch S is thrown in the circuit of the lamp 45 is completed as follows: X, S, R, B, 44, 45, 40, back to the source of current supply X. The pilot in receiving this signal throws in the switch 42 thereby completing the circuit of the motor 6 which operates and causes the propeller 4 to revolve. As the speed of the propeller increases the aeroplane moves about the speedway W supported by the wheels 30. After sufficient momentum is gained the aeroplane arises from the track by means of the lifting power of the planes 1 and the centrifugal force developed which exerts a gyroscopic influence and creates stability. As the speed of each car is under control of its own pilot it naturally follows that each car can attain a desired elevation independent of the others. In fact, although the aeroplanes are attached to the same movable hub or ring 53 by flexible restraining cables C, there will be no danger of collision as the space between the cars is in the same proportion as the space between the openings in the hub 53 through which the restraining cables pass.

Regardless of the number of aroplanes used, each one when in flight will extend outwardly from its point of fastening on the hub similar to a spoke in a wheel. Although the aeroplanes with their restraining cables can be likened to the spokes of a wheel as to spacing, each one is capable of independent flight as to elevation. One aeroplane may in flight attain an elevation of twenty feet above the speedway, another thirty feet and still another forty feet or more. The desired elevation can be attained by the pilots by regulating the speed of the motors and properly adjusting the tails of the aeroplanes.

When it is desired to end the flight of the aeroplanes, the tower operator opens the switch S thereby extinguishing the lamps 45 in each aeroplane. The pilots noting the extinguishing of this signal lamp will then operate their switches 46, thus causing their respective signal lamps 48 in the tower to light. The lighting of these lamps notifies the operator that the extinguishing of the lamps 45 has been noted. The tower operator then opens the switch M disconnecting current from the motors of all the aeroplanes. The pilots, of course, after receiving the signals that the flight is to cease adjust the tails 3 of their respective aeroplanes in preparation for descent to the speedway.

With a standard speed established and in order to maintain the proper centrifugal force extended by each car, a speedometer is placed in each car and also in the tower. This will also serve to indicate the power required for the loaded or partly loaded aeroplanes.

Of course movable planes may be attached to each car and under control of the pilot for regulating the flight.

While I have shown my invention as applied to aeroplanes it follows that hydroaeroplanes may be used. In such an event the tower would be entirely surrounded by water or the water-course could be inclosed within retaining walls of a circular inclosure corresponding to the speedway itself. The cars would be constructed for water-travel as well as for air flight.

Having thus described my invention, what I desire to secure by Letters Patent is:

1. In a captive aeroplane device, the combination with a tower, of an aeroplane provided with individual motive means for causing its flight about said tower, two V-shaped restraining cables extending radially from said tower and attached respectively to the rear and forward parts of said aeroplane at points above and below the center of gravity, to equalize the pull and maintain the balance of said aeroplane when in flight, the flight of said aeroplane in upward and downward directions being controlled by said individual motive means, the extent of said flight in an outward direction being controlled by said restraining cables.

2. In a captive aeroplane device, the combination with a tower provided with a movable hub or ring, of an aeroplane provided with individual motive means for causing its flight about said tower, two V-shaped restraining cables extending radially from said hub and attached respectively to the rear and forward parts of said aeroplane at points above and below the center of gravity, to equalize the pull and maintain the balance of said aeroplane when in flight but normally exerting no influence thereon, the flight of said aeroplane in upward and downward directions being controlled entirely by said individual motive means, the extent of the flight as to distance remaining constant in relation to said hub.

3. In a captive aeroplane device, the combination with a tower provided with a carriage, of a hub or ring mounted and rotatable upon said carriage, a raised speedway encircling said tower, cables extending from said carriage to said speedway for supporting said tower, an aeroplane provided with individual motive means for causing its flight and for causing the rotation of said hub on said carriage, two V-shaped restraining cables extending radially from said hub and attached respectively to the rear and forward parts of said aeroplane at points above and below the center of gravity, to equalize the pull and maintain the balance of said aeroplane when in flight but normally exerting no influence thereon, the flight of said aeroplane in an upward and downward direction being controlled entirely by said individual motive means, and additional means for controlling said motive means at will.

4. In an apparatus of the class described, the combination with a tower provided with a movable hub or ring, of a plurality of aeroplanes, two V-shaped restraining cables extending radially from said hub to each of said aeroplanes and attached respectively to the rear and forward parts of said aeroplanes at points above and below the center of gravity, to maintain the balance of said aeroplanes when in flight but normally exerting no influence thereon, individual motive means associated with each of said aeroplanes for causing its flight about said tower, the limit of the flight of each aeroplane in an upward and downward direction being controlled by its individual motive means, the flight of each aeroplane being entirely independent of the other.

5. In an apparatus of the class described, the combination with a tower, of a plurality of aeroplanes, two V-shaped restraining cables extending from said tower to each of said aeroplanes and attached thereto at points above and below the center of gravity for maintaining the balance of said aeroplanes when in flight, said aeroplanes when at rest being entirely self-supporting and independent of said cables, individual motive means associated with each of said aeroplanes for causing its flight about said tower, additional individual means associated with each of said aeroplanes for controlling the motive means for varying its flight in an upward and downward direction irrespective of the others.

6. In a device of the class described, the combination with a tower provided with a movable hub or ring, of a plurality of aeroplanes attached to said hub by means of radially extending cables, an individual motor associated with each of said aeroplanes for controlling its flight, signaling means for each of said aeroplanes, a source of current supply, a plurality of distributing devices carried by said hub for supplying the source of current for said motive and signaling means.

7. In a device of the class described, the combination with a tower and a plurality of aeroplanes movably attached thereto by radially extending cables, an electric motor for each of said aeroplanes for causing its flight about said tower, a visual signal in each of said aeroplanes controlled from said tower, means associated with each of said aeroplanes for regulating the speed of its motor in response to said visual signal.

8. In a device of the class described, the combination with a tower provided with a movable hub or ring, of a plurality of aeroplanes attached to said hub by means of radially extending cables, a plurality of distributer rings attached to said tower, a plurality of brushes or contact arms carried by said hub to engage said rings, an electric motor for each of said aeroplanes for causing its flight about said tower, a visual signal in each of said aeroplanes controlled from said tower, a source of current supply for said motor and said signals, said source of current supply being distributed by means of said distributer rings and brushes.

9. In a device of the class described, the combination with a tower provided with a rotatable hub or ring, of a plurality of aeroplanes attached to said hub by means of radially extending cables, a plurality of distributer rings attached to said tower, a plurality of contact arms carried by said hub and engaging said rings, an electric motor for each of said aeroplanes for causing its independent flight about said tower for causing the rotation of said hub, a visual signal in each of said aeroplanes controlled from said tower, a visual signal in said tower individual to each of said aeroplanes, said signals serving to determine the control of said electric motors, a source of current supply, said source of current supply being distributed to said motors and signals by means of said distributer rings and contact arms.

In testimony whereof I affix my signature in presence of two witnesses.

CLAUDE S. McCOOLE.

Witnesses:
H. POLATSEK,
JOSEPH HERSHEY.